July 24, 1934.   R. H. SIMONDS   1,967,434
OPHTHALMIC MOUNTING
Original Filed Sept. 10, 1929
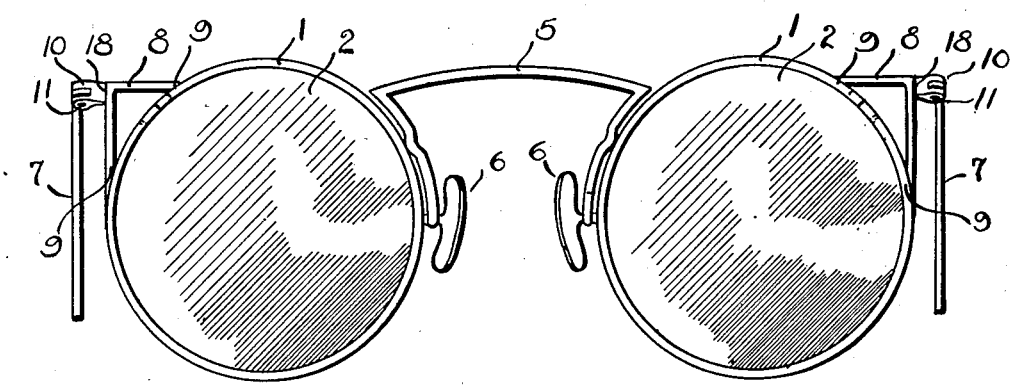
FIG. I
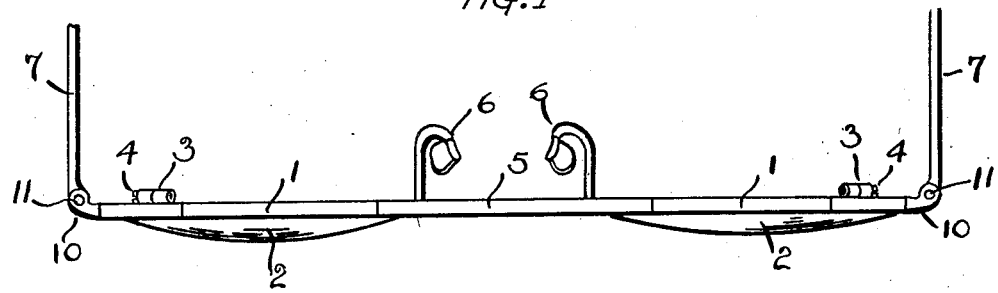
FIG. II
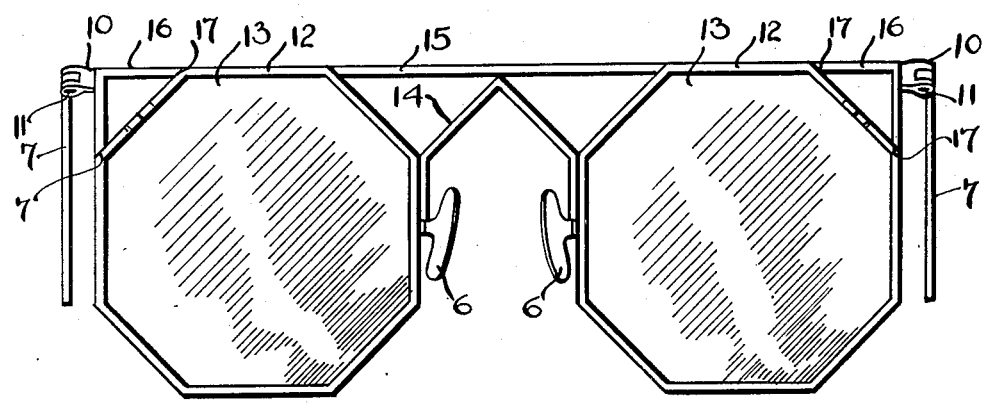
FIG. III
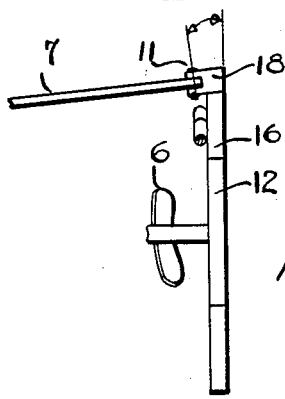
FIG. IV
Inventor
Royal H. Simonds
By Harry H. Styll
Attorney Patented July 24, 1934

1,967,434

UNITED STATES PATENT OFFICE 1,967,434

OPHTHALMIC MOUNTING

Royal H. Simonds, Southbridge, Mass., assignor to American Optical Company, Southbridge, Mass., a voluntary association of Massachusetts Application September 10, 1929, Serial No. 391,562
Renewed December 16, 1932

14 Claims. (Cl. 88—47)

This invention relates to ophthalmic mountings and has particular reference to an improved form of supporting frame for the type of mounting having the temples positioned out of the useful field of vision of the wearer.

A principal object of this invention is to provide means whereby the wide and comfortable space between the temples of the usual type of ophthalmic mounting may be retained in the type having the temples positioned out of the useful field of vision of the wearer.

A further object of this invention is to provide means for the use of ordinary standard shapes of lens rims, such as circular or octagon, in the improved type of frame.

Another object of the invention is to maintain a sightly and well-proportioned appearance in the improved frame while providing the comfort of wide temple spacing.

Another object of the invention is to provide economical means of accomplishing the results desired without detracting from the appearance of the mounting.

Other objects and advantages will become apparent from the following description taken in connection with the accompanying drawings and it will be apparent that many changes may be made in the details of construction and arrangement of parts without departing from the spirit of the invention as expressed in the accompanying claims. I, therefore, do not wish to be limited to the exact details shown and described as the preferred forms only have been shown by way of illustration.

Referring to the drawing:

Fig. I is a front view of an ophthalmic mounting embodying the invention.

Fig. II is a top or plan view of Fig. I.

Fig. III is a front view of the invention applied to a modified form of ophthalmic mounting.

Fig. IV is an end view of Fig. III.

Since the introduction of ophthalmic mountings having the temples positioned at a high point on the lens rim in order to remove them from the useful field of vision of the wearer, it has become apparent that serious disadvantages are associated with this type. Formerly the temples were invariably positioned on the horizontal meridian of the lenses, which in the case of the usual circular rims was at the point farthest removed from the nasal centerline. This positioned the temples so that the greatest possible space was available between them for clearance for the wearers' head and maximum comfort was assured. However, upon moving the temples away from this point around the rim the distance between them became less and at the most suitable point out of the useful field of vision, it was extremely limited if the usual type of endpiece was used. Many remedies were tried, such as lengthening the endpieces out of all proportion to the frame itself, but in my invention I have provided a simple yet effective means of accomplishing the desired result and have therefore obtained all of the advantages of the "out of vision" temples with none of the grave disadvantages heretofore associated therewith. At the same time I have provided means to eliminate other disadvantages of the prior mountings as will hereinafter be apparent.

Referring to the drawing wherein similar characters of reference denote corresponding parts throughout the several views I first form my lens rims 1 by the usual method of bending a suitably grooved split ring to the desired size of the lenses 2 which are to be fitted therein. I next attach, by soldering or other suitable process, a short, tubular endpiece 3 to each side of the split on the rims 1. One of the endpieces 3 may be threaded and a screw 4 used to draw the ends of the split together when the lenses 2 are in position. A suitably formed bridge 5 and guards 6 may be used to join the lens rims 1 together at the desired distance from each other and the mounting is ready for the more particularly novel features of the invention to be carried out.

I propose to position the temples 7 of my improved mounting out of the field of vision and as I also propose to make use of the standard circular rims 1 it will be obvious that as I move the temples up on the rims 1 they will gradually draw closer together. To overcome this disadvantage without employing unsightly and specially formed endpieces I first form angle bars 8 of preferably similar dimensioned material as used for the rims 1. I next attach, by soldering or other methods, the angle bars 8 to the rims 1 at the point 9 in Fig. I. It will be apparent that the point 18 of each angle bar 8 is on a line with the horizontal meridian of the lens rim 1 or at the farthest possible distance on the frame itself from the other angle bar 8.

I now attach the standard form of endpiece 10 to each angle bar 8 and pivotally secure the temple 7 therein. It will be noted that the endpieces 10 are preferably tilted so that the pivot 11 is at an angle to the plane of the lenses as shown in Fig. IV thus bringing the temples 7 in a gradually dropping line to the wearers's ears.

It will also be noted that the tubular endpieces 3 have been located between the ends 9 of the angle bars 8 and these bars are usually slightly resilient in order to move enough when the split rim 1 are separated to insert the lenses 2. However, the tubular endpieces do not necessarily have to be at the point shown but might well be at any point around the lens rim 1 as will appear preferable to the maker.

In the foregoing description it will be apparent that all the parts included have been of well known standard construction which have been evolved after many years experience on the part of the optical industry. In this regard it will be obvious that my invention is of an economical nature and also incorporates the most suitable forms of component parts for grace and strength as found by experience.

The invention is not confined to a mounting having circular rims and in Fig. III I have shown a modified form thereof which contemplates the use of octagonal rims and a generally decorative frame.

In the application of my invention to this form I first form the rims 12 by shaping to octagonal or other polygonal form a split ring to suit the outline shape of the lenses 13 to be fitted therein.

At the split ends of the rims 12 I attach by suitable means the tubular endpieces 3 as in the previously described case, also drawing the ends together with the screw 4 or other suitable means.

I next affix similar guards 6 and a suitably shaped bridge member 14 and reinforcing member 15 to match the angular form of the lenses 13. Other shapes of bridge may be used at the discretion of the manufacturer with equal facility.

I can now attach angle bars 16 to the lens rims 12 at the points 17 and these bars may be of a similar width and thickness as the material used for the lense rims 12. To the angle bars 16 I attach by the usual method the endpieces 10 as in the previously described form and also pivot at 11 the temples 7 which are preferably tilted to a similar angle as described for the preceding case.

From the foregoing description it will be seen that I have provided novel means of obtaining all of the advantages of placing the temple out of the line of vision without the disadvantages usually associated with this type, particularly avoiding the possibility of the temples cutting into the face of the wearer and being of an unsightly appearance.

Having described my invention, I claim:

1. An ophthalmic mounting having a pair of split lens holding members connected centrally by a bridge member, means on said split holding members for securing the split ends together, said means being adjustable to vary the pressure of the lens holding member on the lens a temple connection and a bent support secured intermediate its ends to the temple connection and having its end portions secured to a lens holding member at each side of the split, said support forming auxiliary lens retaining means for retaining the lens in the holding member when the pressure of the securing means is released.

2. An ophthalmic mounting having a pair of split lens holding members connected centrally by a bridge member, means on said split holding members for securing the split ends together, said means being adjustable to vary the pressure of the lens holding member on the lens a temple connection and a bifurcated support between said temple connection and a lens holding member having its end portions spanning the split and secured at each side thereof to the lens holding member, said bifurcated support forming auxiliary lens retaining means for retaining the lens in the holding member when the pressure of the securing means is released.

3. An ophthalmic mounting having a pair of split lens holding members connected centrally by a bridge member, means on said split holding members for securing the split ends together, a temple connection and a bent support secured intermediate its ends to the temple connection and having its end portions secured to a lens holding member at each side of the split, the central cross portion of said bridge member, temple connection and the top portion of the support all lying substantially in the same plane.

4. An ophthalmic mounting having a pair of split lens holding members connected centrally by a bridge member, means on said split holding members for securing the split ends together, said means being adjustable to vary the pressure of the holding member on the lens, a temple connection and a bifurcated support between said temple connection and a lens holding member having its end portions spanning the split and secured at each side thereof to the lens holding member, said bifurcated support forming auxiliary lens retaining means for retaining the lens in the holding member when the pressure of the securing means is released, said support and temple connection being located above a horizontal plane connecting the mechanical centers of the lens holding members.

5. An ophthalmic mounting having a pair of split lens holding members connected centrally by a bridge member, means on said split holding members for securing the split ends together, said means being adjustable to vary the pressure of the holding member on the lens, a temple connection and a bent support secured intermediate its ends to the temple connection and having its end portions secured to a lens holding member at each side of the split, said support forming auxiliary lens retaining means for retaining the lens in the holding member when the pressure of the securing means is released, said support and temple connection being located above a horizontal plane connecting the mechanical centers of the lens holding members.

6. An ophthalmic mounting comprising a pair of lens holding rims, a horizontal bridge member attached to the nasal side of each of said rims adjacent the top thereof, an inclined brace member connecting the nasal sides of each of the rims and said bridge adjacent the center of said bridge, an offset nose guard extending inwardly from the nasal side of each rim, a bent strut member having its ends separated and secured to said rim above the center thereof on the temporal side of each rim and a pivotal temple endpiece connection carried by each strut intermediate its ends.

7. An ophthalmic mounting having lens holding means connected by a bridge, a bifurcated strut member having its ends separated and each secured to the lens holding means above the center of the lens on the temporal side thereof and a pivotal temple endpiece connection carried by said strut intermediate its ends, the central cross portion of the bridge member, temple endpiece connection and the top portion of the strut all lying substantially in the same plane.

8. An ophthalmic mounting having lens holding means connected by a bridge, a bent support member having its ends separated and each end secured to the lens holding means above the center of the lens on the temporal side thereof and a temple endpiece connection carried by said strut intermediate its ends, the central cross portion of the bridge member, temple endpiece connection and the top portion of the bent support all lying substantially in the same plane.

9. An ophthalmic mounting having a pair of split lens holding members connected centrally by a bridge member, means on said split holding members for securing the split ends together, a temple connection and a bent support secured intermediate its ends to the temple connection and having its end portions secured to a lens holding member at each side of the split, the temple connection and the top portion of the support lying on substantially the same level above the line of centers of the pupils of the eyes when the device is in normal position on the face of the wearer.

10. An ophthalmic mounting comprising lens holding means, a bridge member connecting the lens holding means, temples for holding the mounting in place on the face, said temples terminating in temple hinge connections positioned to the rear of the plane of the mounting and laterally spaced outwardly from the temporal sides thereof and said temples inclined downwardly from the rear of the lens plane, relatively long and slender supporting arms extending from the temple hinge connections said arm being bifurcated and having both branches of the bifurcation unpivotally associated with the lens holding means and having temple hinge connections pivotally associated with the hinge connections of the temples, the axes of said pivotal means being inclined to the plane of the lenses.

11. An ophthalmic mounting comprising lens holding rims, a bridge member connecting the rims, temples for holding the mounting in place on the face, said temples terminating in temple hinge connections positioned to the rear of the plane of the rims and laterally spaced outwardly from the temporal sides thereof and said temples inclined downwardly from the rear of the plane of the rims, relatively long and slender supporting arms extending from the temple hinge connections said arm being bifurcated and having both branches of the bifurcation unpivotally associated with the rims and temple hinge connections pivotally associated with the hinge connections of the temples, the axes of said pivotal means being inclined to the plane of the rims.

12. An ophthalmic mounting comprising lens holding means, a bridge member connecting the lens holding means, temples for holding the mounting in place on the face, said temples terminating in temple hinge connections, temple hinge connections pivotally associated with the first temple hinge connections, the bearing portions of said second temple hinge connections extending beyond the rear of the plane of the lenses and located outwardly from the temporal sides of the lenses, relatively long and slender supporting arms associated with the said second temple hinge connections, said arm being bifurcated and each branch of the bifurcation being unpivotally associated with the said lens holding means.

13. An ophthalmic mounting comprising lens holding means, a bridge member connecting the lens holding means, temples for holding the mounting in place on the face, said temples terminating in temple hinge connections, temple hinge connections pivotally associated with the first temple hinge connections, the bearing portions of said second temple hinge connections extending beyond the rear of the plane of the lenses and located outwardly from the temporal sides of the lenses, relatively long and slender supporting arms associated with the said second temple hinge connections, said arms being bifurcated and each branch of the bifurcation being unpivotally associated with the said lens holding means, the said temples being inclined downwardly from the rear of the lenses, and the axes of the pivotal means of said temple hinge connections being inclined to the plane of the lenses.

14. An ophthalmic mounting comprising a split lens holding rim, abutting lugs on the rim adjacent the split, means for securing the lugs together and a supporting strut arm, said arm being bifurcated and having the free ends of the bifurcations secured to the rim on their respective sides of the split.

ROYAL H. SIMONDS.